United States Patent
Kim et al.

(10) Patent No.: US 7,684,631 B2
(45) Date of Patent: Mar. 23, 2010

(54) METHOD AND APPARATUS FOR PREDICTING DISCRETE COSINE TRANSFORM COEFFICIENTS

(75) Inventors: Hyeyun Kim, Yongin-si (KR); Shihwa Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 550 days.

(21) Appl. No.: 11/135,435

(22) Filed: May 24, 2005

(65) Prior Publication Data

US 2006/0013498 A1   Jan. 19, 2006

(30) Foreign Application Priority Data

Jul. 14, 2004   (KR) .................... 10-2004-0054714

(51) Int. Cl.
*G06K 9/46* (2006.01)
*H04B 1/66* (2006.01)

(52) U.S. Cl. .................................. 382/250; 375/240.2

(58) Field of Classification Search ................ 382/250, 382/232–249, 251–253; 375/240–240.27
See application file for complete search history.

(56) References Cited

U.S. PATENT DOCUMENTS 5,737,022 A * 4/1998 Yamaguchi et al. .... 375/240.15
6,148,109 A   11/2000 Boon et al.
6,173,080 B1   1/2001 Cho et al.

OTHER PUBLICATIONS

Search Report issued in European Patent Application No. 05254129.9 on Dec. 15, 2006.
"Advanced Video Coding For Generic Audiovisual Services", Geneva, ITU-T Recommendation H.264, May 30, 2003, XP017401452.

* cited by examiner

*Primary Examiner*—Aaron W Carter
(74) *Attorney, Agent, or Firm*—NSIP Law (57) ABSTRACT

A method of and an apparatus for predicting discrete cosine transform coefficients. A discrete cosine transform coefficient prediction method and apparatus performs a discrete cosine transform on a row and column of pixel blocks nearest to a transform coefficient to be predicted in a discrete cosine transform block to be predicted among pixel blocks adjacent to the discrete cosine transform block to create a prediction coefficient for the transform coefficient to be predicted, and predict the transform coefficient to be predicted using the created prediction coefficient. By using prediction coefficients with higher correlation to a transform coefficient of a discrete cosine transform block to be predicted, an image may be efficiently compressed.

22 Claims, 12 Drawing Sheets

METHOD AND APPARATUS FOR PREDICTING DISCRETE COSINE TRANSFORM COEFFICIENTS

BACKGROUND OF THE INVENTION

This application claims the priority of Korean Patent Application No. 2004-54714, filed on Jul. 14, 2004, in the Korean Intellectual Property Office, the disclosure of which is incorporated herein by reference.

1. Field of the Invention

The present invention relates to a method of and an apparatus for predicting discrete cosine transform coefficients, and more particularly, to a discrete cosine transform coefficient prediction method and apparatus, which perform a discrete cosine transform on a row and column of pixel blocks nearest to a transform coefficient to be predicted in a discrete cosine transform block to be predicted among pixel blocks adjacent to the discrete cosine transform block to be predicted to create a prediction coefficient for the transform coefficient to be predicted, and predict the transform coefficient using the created prediction coefficient.

2. Description of the Related Art

Compressing data to a digital format, particularly, compressing image signals is essential in various multimedia environments. However, since image signals include much information, many limitations exist in efficiently transmitting, storing and processing such image signals. To reduce such limitations, international standards, such as MPEG-2, MPEG-4, H.263 and H.26L, define compression stream grammars and coding methods.

By dividing an input image into pixel blocks in a predetermined area, for example, to 8×8 pixel blocks and performing a discrete cosine transform (DCT) on each pixel block, pixel coefficients arranged with high spatial correlations are converted to various frequency components from low-frequency components to high-frequency components. In a discrete cosine transform block, no correlation exists between frequency components and the energy of signals is focused on low-frequency components. Accordingly, by predicting transform coefficients located at a first row and a first column where low-frequency components are concentrated in a discrete cosine transform block, it is possible to efficiently compress an image.

Figure 1:
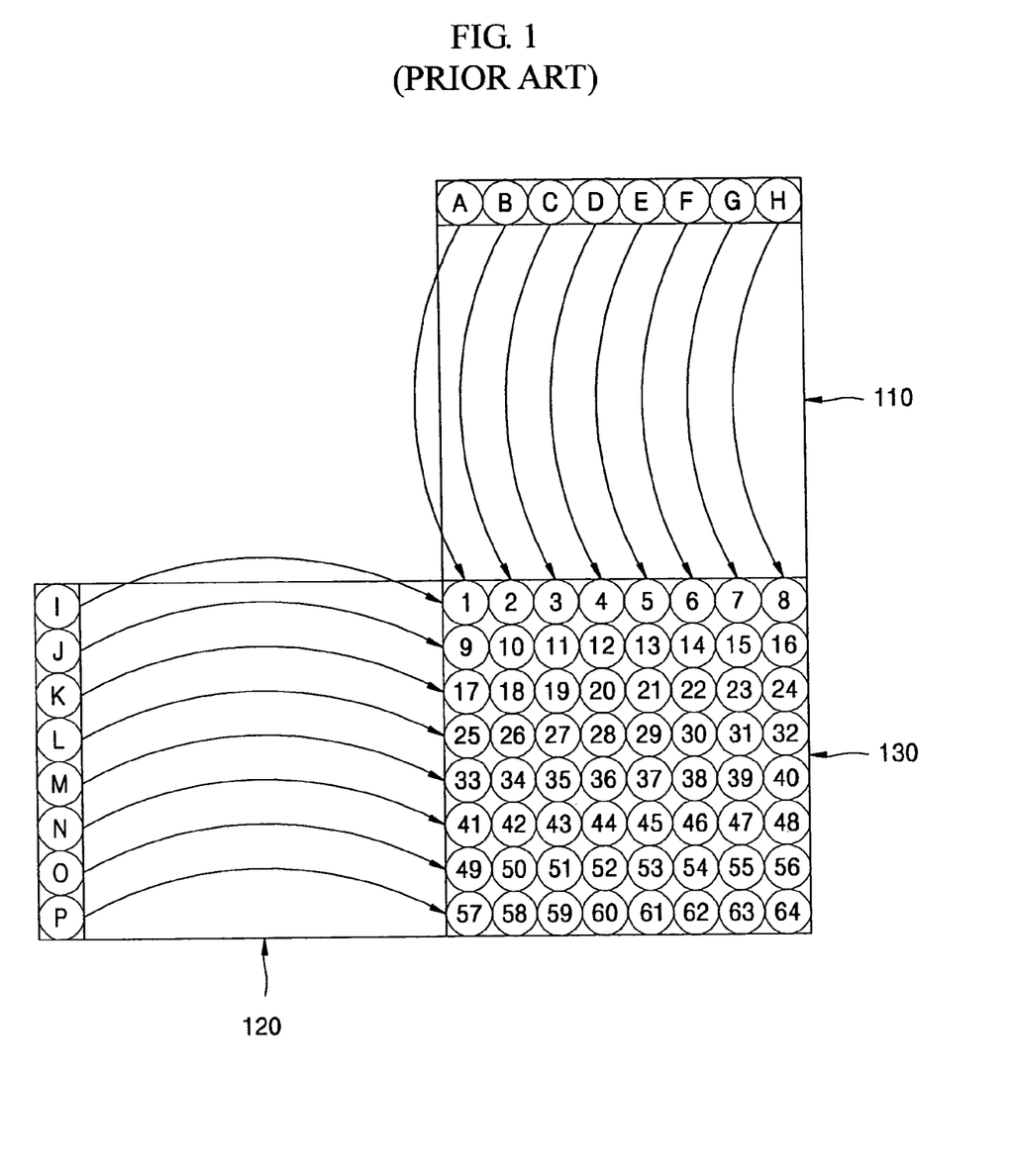
FIG. 1 is a view for explaining a conventional discrete cosine transform coefficient prediction method.

FIG. 1 is a view for explaining a conventional discrete cosine transform coefficient prediction method. In FIG. 1, blocks 110 through 130 are discrete cosine transform blocks. To predict transform coefficients 1 through 8 of the discrete cosine transform block 130, transform coefficients A through H of the discrete cosine transform block 110 are used as prediction coefficients for the transform coefficients. 1 through 8. Meanwhile, to predict transform coefficients 1, 9, 17, 25, 33, 41, 49 and 57 of the discrete cosine transform block 130, transform coefficients I, J, K, L, M, N, O and P of the discrete cosine transform block 120 are used as prediction coefficients for the transform coefficients 1, 9, 17, 25, 33, 41, 49 and 57. By creating prediction values for the transform coefficients to be predicted based on differences between the prediction coefficients and the transform coefficients to be predicted and quantizing the created prediction values, an image may be efficiently compressed.

Figure 2:
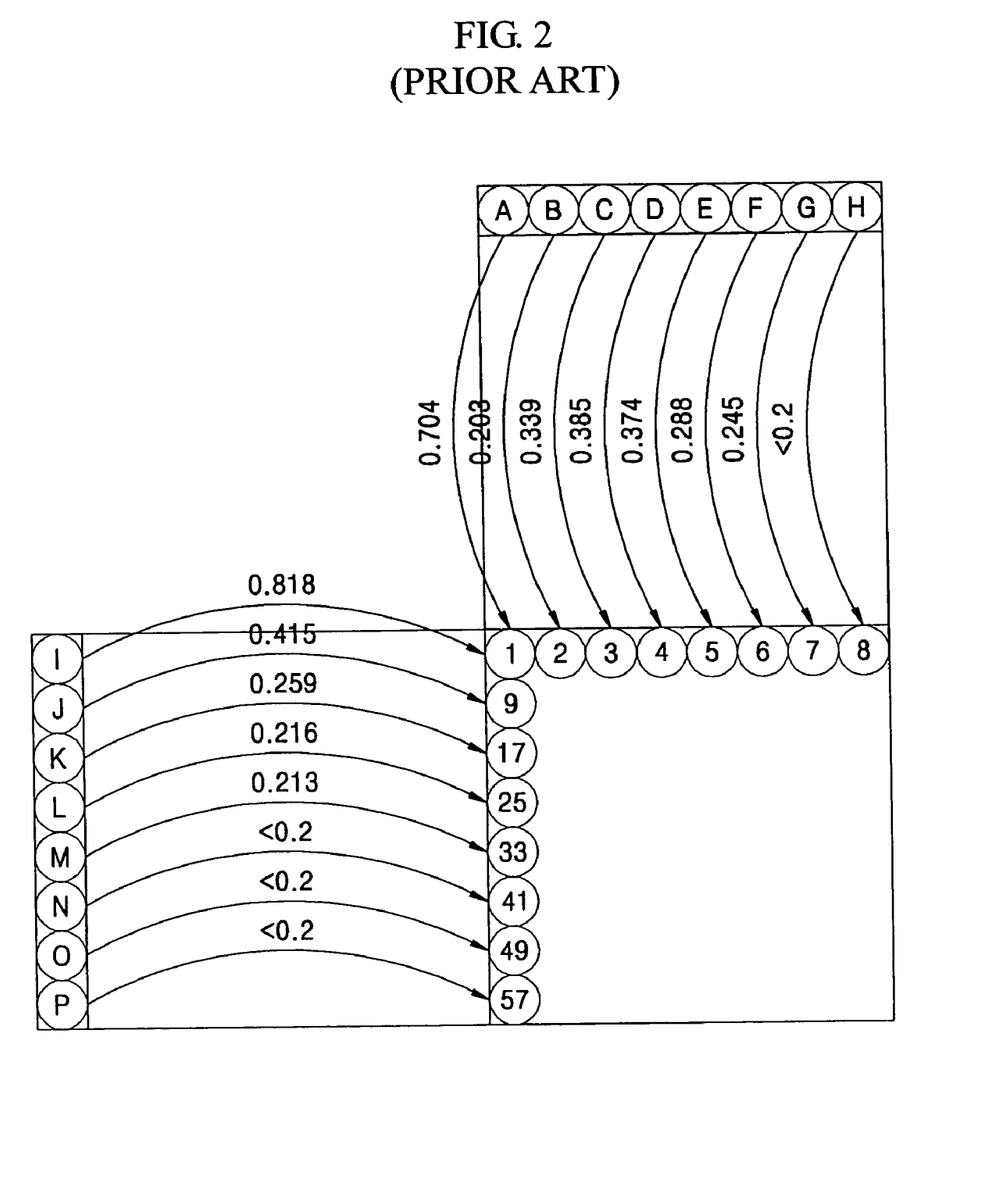
FIG. 2 is a view for explaining correlation coefficients between transform coefficients and prediction coefficients in the conventional discrete cosine transform coefficient prediction method.

FIG. 2 is a view for explaining correlation coefficients between transform coefficients and prediction coefficients in the conventional discrete cosine transform coefficient prediction method.

A correlation coefficient between a prediction coefficient and a transform coefficient represents similarity between the prediction coefficient and the transform coefficient. As the correlation coefficient is higher, the prediction value which is calculated based on the difference between the transform coefficient and the prediction coefficient, is smaller. Thus, the smaller prediction value allows more efficient compression of an image. A correlation coefficient between a prediction coefficient and a transform coefficient can be calculated by Equation 1.

$$\hat{p} = r = \frac{\sum (x_1 - \bar{x})(y_1 - \bar{y})}{\sqrt{\sum (x_1 - \bar{x})^2} \sqrt{\sum (y_1 - \bar{y})^2}} \quad (1)$$

Here, $x_1$ is a location of the prediction coefficient and $y_1$ is a location of the transform coefficient.

Therefore, to more efficiently compress a predetermined image, it is preferable to create a prediction value for a transform coefficient of a discrete cosine transform block to be predicted, using a prediction coefficient with a higher correlation to the transform coefficient of the discrete cosine transform block.

SUMMARY OF THE INVENTION

An embodiment of the present invention provides a method of and an apparatus for predicting a transform coefficient of a discrete cosine transform block by creating a prediction coefficient with a higher correlation to the transform coefficient of the discrete cosine transform block to be predicted.

An embodiment of the present invention also provides a method of and an apparatus for predicting a transform coefficient of a discrete cosine transform block by creating a prediction coefficient with a higher correlation to the transform coefficient of the discrete cosine transform block to be predicted in a predetermined prediction mode.

An embodiment of the present invention also provides a computer-readable medium having embodied thereon a computer program for executing the transform coefficient prediction method.

According to an aspect of the present invention, there is provided a discrete cosine transform (DCT) coefficient prediction method comprising: performing a discrete cosine transform on a row and column of pixel blocks, nearest to a transform coefficient to be predicted in a discrete cosine transform block to be predicted among pixel blocks adjacent to the discrete cosine transform block to be predicted, and creating prediction coefficients for the transform coefficient to be predicted; and creating a prediction value for the transform coefficient to be predicted using a difference between the created prediction coefficients and the transform coefficient to be predicted, and predicting the transform coefficient to be predicted based on the prediction value.

According to another aspect of the present invention, there is provided a DCT coefficient prediction method comprising: creating candidate prediction coefficients for a transform coefficient to be predicted, using coefficients created by performing a discrete cosine transform on a row and column of pixel blocks, nearest to the transform coefficient to be predicted in a discrete cosine transform block to be predicted among pixel blocks adjacent to the discrete cosine transform block, respectively, a predetermined number of coefficients at the most right side of prediction coefficients for a transform block located at the left side of the discrete cosine transform block to be predicted, and a predetermined number of coefficients at the most left side of coefficients created by performing a discrete cosine transform on pixel coefficients of a pixel block located at the upper right side of the discrete cosine transform block to be predicted; selecting a prediction mode for creating prediction coefficients for the transform coefficient to be predicted among a plurality of prediction modes; creating prediction coefficients for the transform coefficient to be predicted according to the selected prediction mode; and generating a prediction value for the transform coefficient to be predicted using a difference between the created prediction coefficients and the transform coefficient and predicting the transform coefficient to be predicted based on the prediction value.

According to another aspect of the present invention, there is provided a DCT coefficient prediction apparatus comprising: a prediction coefficient generator performing a discrete cosine transform on a row and column of pixel blocks, nearest to a transform coefficient to be predicted in a discrete cosine transform block to be predicted among pixel blocks adjacent to the discrete cosine transform block to be predicted, respectively, and creating prediction coefficients for the transform coefficient to be predicted; and a prediction value generator creating a prediction value for the transform coefficient to be predicted using a difference between the created prediction coefficients and the transform coefficient to be predicted.

According to another aspect of the present invention, there is provided a DCT coefficient prediction apparatus comprising: a candidate prediction coefficient generator creating candidate prediction coefficients for a transform coefficient to be predicted, using coefficients created by performing a discrete cosine transform on a row and column of pixel blocks, nearest to the transform coefficient to be predicted in a discrete cosine transform block to be predicted among pixel blocks adjacent to the discrete cosine transform block, respectively, a predetermined number of transform coefficients at the most right side of prediction coefficients in a transform block located at the left side of the discrete cosine transform block to be predicted, and a predetermined number of transform coefficients at the most left side of coefficients created by performing a discrete cosine transform on pixel coefficients of a pixel block located at the upper right side of the discrete cosine transform block to be predicted; a selector selecting a prediction mode for creating prediction coefficients for the transform coefficient to be predicted among a plurality of prediction modes; a prediction coefficient generator creating the prediction coefficients for the transform coefficient to be predicted according to the selected prediction mode; and a prediction value generator generating a prediction value for the transform coefficient to be predicted using a difference between the created prediction coefficients and the transform coefficient.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
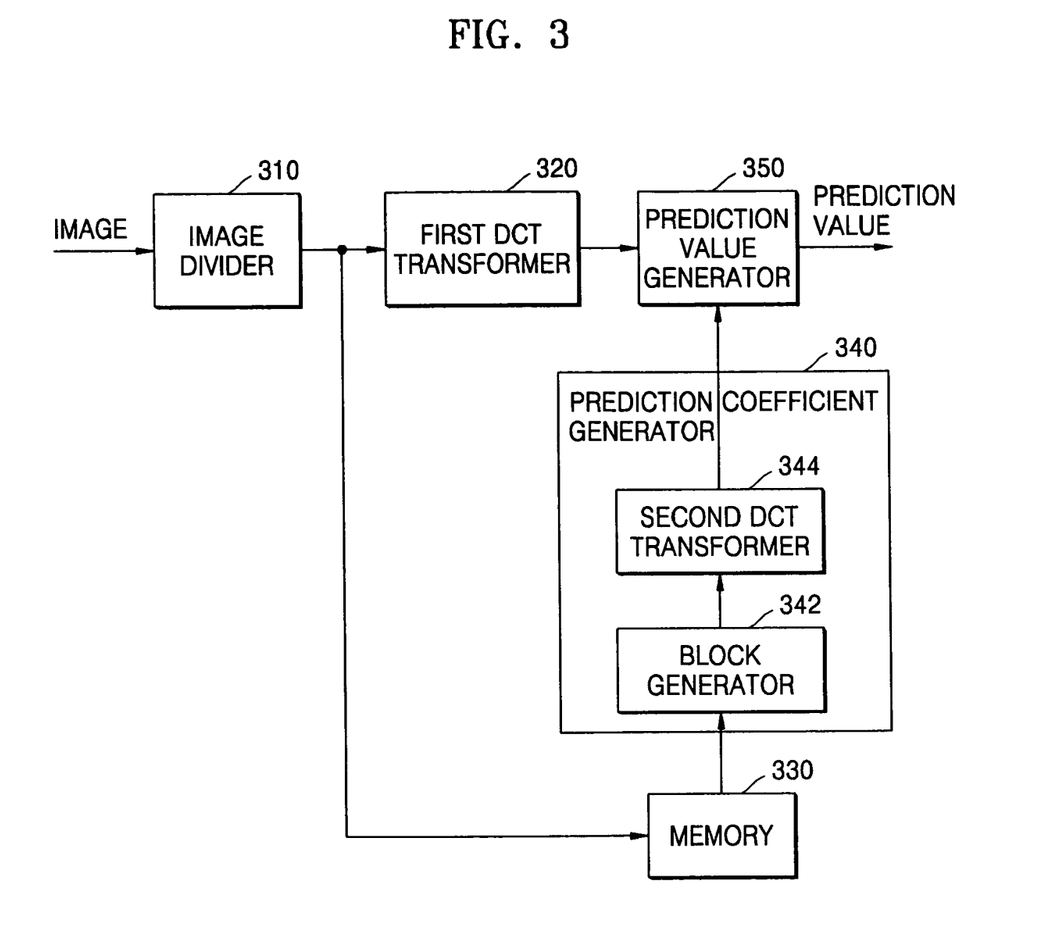
FIG. 3 is a functional block diagram of a discrete cosine transform coefficient prediction apparatus according to an embodiment of the present invention.

FIG. 3 is a functional block diagram of a discrete cosine transform (DCT) coefficient prediction apparatus according to an embodiment of the present invention. The discrete cosine transform coefficient prediction apparatus includes an image divider 310, a first DCT transformer 320, a memory 330, a prediction coefficient generator 340, and a prediction value generator 350. The image divider 310 divides an image to be compressed into pixel blocks with sizes of 8×8, 16×16, 8×16, 16×8, etc. In the following description, it is assumed that an image is divided into 8×8 pixel blocks. The 8×8 pixel blocks created by the image divider 310 consist of pixel coefficients in a spatial domain to represent the image. The first DCT transformer 320 performs a discrete cosine transform (DCT) on the pixel block to be predicted and transforms the pixel blocks in the spatial domain to transform blocks in a frequency domain. The memory 330 stores the 8×8 pixel blocks of the image divided by the image divider 310. The prediction coefficient generator 340 includes a block generator 342 and a second DCT transformer 344, and performs a discrete cosine transform on a predetermined row and column of pixel blocks nearest to a transform coefficient to be predicted in a discrete cosine transform block to be predicted among adjacent pixel blocks to the discrete cosine transform block to be predicted, respectively, creating prediction coefficients for the transform coefficient to be predicted. The predetermined row and column may be a nearest row and column to the transform block in the pixel blocks nearest to the transform block. The block generator 342 receives the row and column of the pixel blocks nearest to the transform coefficient to be predicted in the discrete cosine transform block among the pixel blocks adjacent to the transform coefficient to be predicted, from the memory 330, and copies the row and column of the pixel blocks in horizontal and vertical directions, respectively, thereby generating pixel blocks each corresponding to the size of the discrete cosine transform block. The second DCT transformer 344 performs a discrete cosine transform on each of the generated pixel blocks and generates prediction coefficients for the transform coefficient to be predicted. The prediction value generator 350 calculates a difference between the transform coefficient to be predicted and the prediction coefficients created by the second DCT transformer 344 and generates a prediction value for the transform coefficient to be predicted based on the difference.

Figure 4:
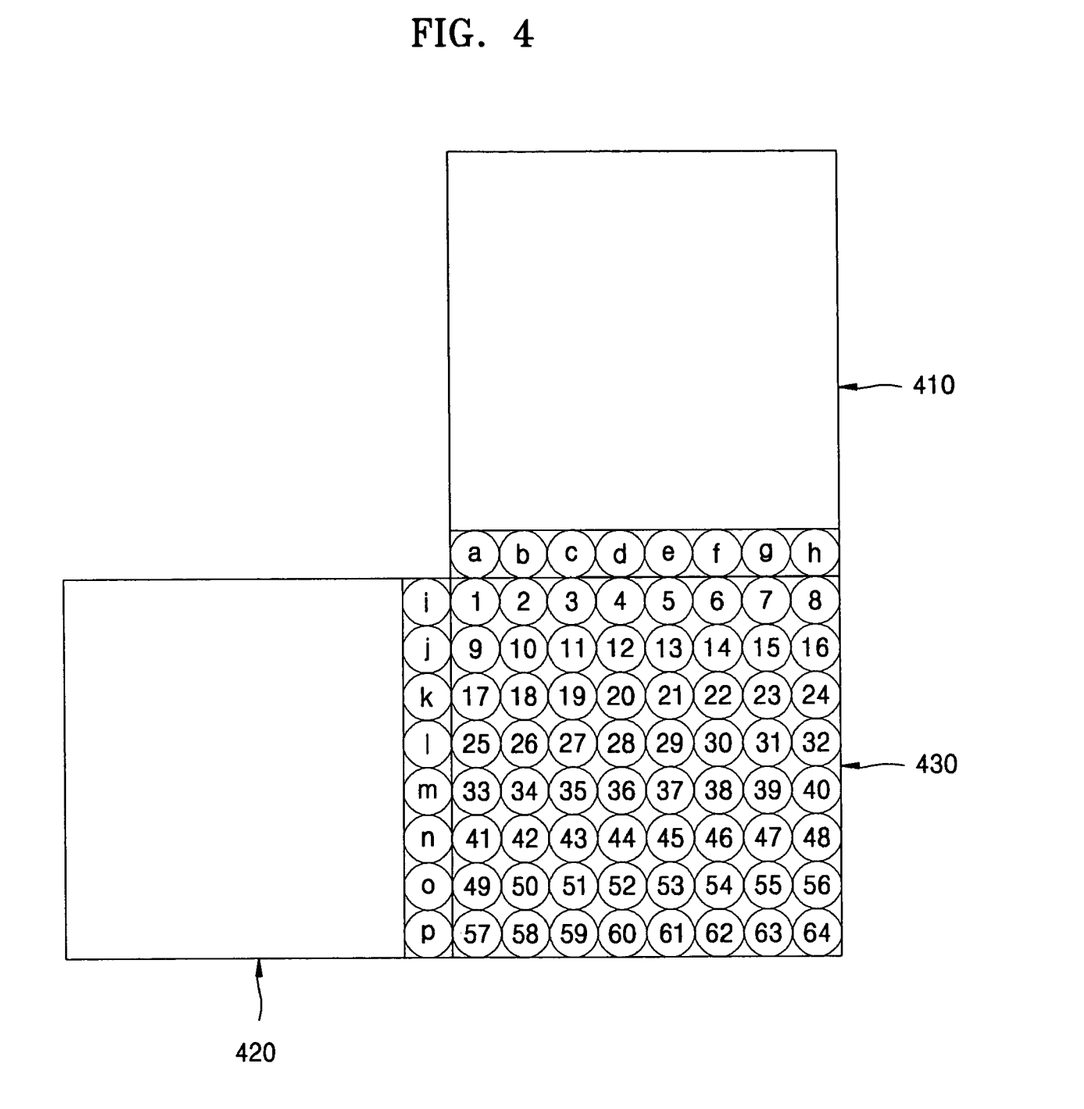
FIG. 4 shows a row and a column of pixel blocks that are used for creating prediction coefficients.

FIG. 4 shows the row and column of the pixel coefficients that are used for generating the prediction coefficients. In FIG. 4, blocks 410 and 420 are pixel blocks and a block 430 is a discrete cosine transform block to be predicted. The pixel blocks 410 and 420 are adjacent to the transform block 430 in a spatial domain. To create prediction coefficients for transform coefficients 1 through 8 at a first row of the transform block 430, pixel coefficients a through h nearest to the transform coefficients 1 through 8 of the pixel block 410 neighboring to the first row of the transform block 430 are used. Meanwhile, to create prediction coefficients for transform coefficient 1, 9, 17, 25, 33, 41, 49 and 57 at a first column of the transform block 430, pixel coefficients i through p nearest to the transform coefficients 1, 9, 17, 25, 33, 41, 49 and 57 of the pixel block 420 neighboring to the first column of the transform block 430 are used.

Figure 5:
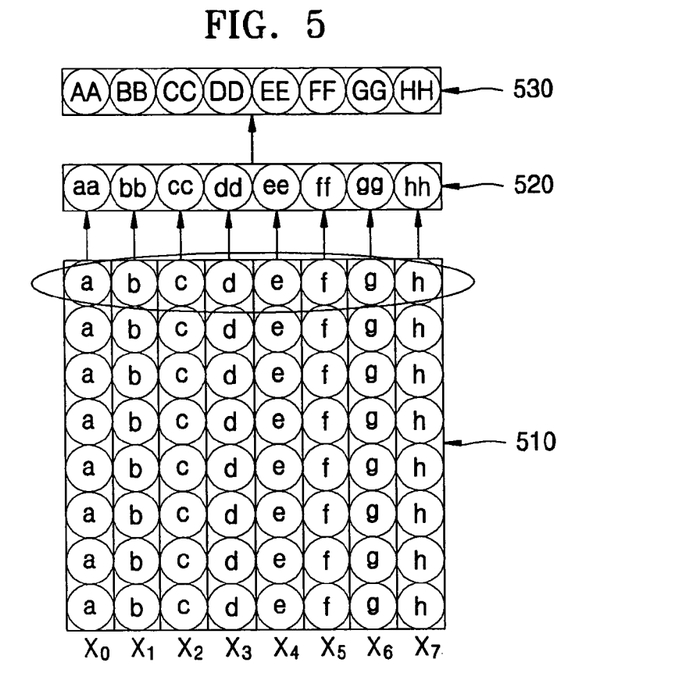
FIG. 5 shows prediction coefficients created using the row and column of the pixel blocks of FIG. 4.

FIG. 5 shows prediction coefficients AA through HH created using the pixel coefficients a through h shown in FIG. 4. A block 510 is a pixel block created by copying the row of the pixel coefficients a through h 8 times in a vertical direction. Since the transform coefficients 1 through 8 to be predicted are transform coefficients of an 8×8 transform block, in order to create prediction coefficients for the transform coefficients to be predicted, it is necessary to copy the row of the pixel coefficients 1 through 8 eight times in the vertical direction and create an 8×8 pixel block corresponding to the 8×8 transform block. To perform a discrete cosine transform on the created 8×8 pixel block through simple calculation, a two-dimensional discrete cosine transform is performed using a Row Column Algorithm (RCA) method which performs a one-dimensional discrete cosine transform on the respective rows and columns of the 8×8 pixel block, respectively. That is, the two-dimensional discrete cosine transform is performed on the 8×8 pixel block, by performing a one-dimensional discrete cosine transform on the respective columns of the 8×8 pixel block, respectively, in a vertical direction, and then performing a one-dimensional discrete cosine transform on the resultant transform values, respectively, in a horizontal direction. In FIG. 5, a block 520 consists of values aa through hh created by performing a one-dimensional discrete cosine transform on the 8×8 pixel block in a vertical direction and a block 530 consists of final two-dimensional discrete cosine transformed values M through HH obtained by again performing a one-dimensional discrete cosine transform on the one-dimensional discrete cosine transformed values aa through hh of the block 520 in a horizontal direction. Meanwhile, prediction coefficients II through PP for the transform coefficients 1, 9, 17, 25, 33, 41, 49 and 57 are created by copying the column of the pixel coefficients i through p 8 times in a horizontal direction to generate an 8×8 pixel block and performing a one-dimensional discrete cosine transform on the respective rows and columns of the generated 8×8 pixel block, respectively, through a similar method as described above. An equation for one-dimensional discrete cosine transform is provided as Equation (2) as follows.

$$X(u) = \sqrt{\frac{2}{N}} C(u) \sum_{i=0}^{N-1} x(i) \cos \frac{(2i+1)u\pi}{2N} \quad (2)$$

In Equation (2), $C(u) = \sqrt{\frac{1}{2}}$ ($u = 0$), $C(u) = 1 (u \neq 0)$.

Figure 6:
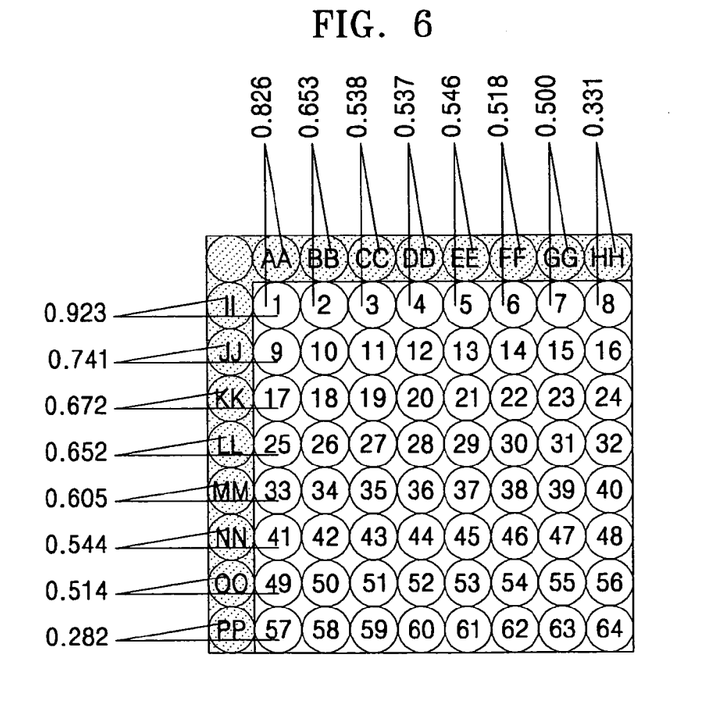
FIG. 6 shows correlation coefficients between prediction coefficients and transform coefficients, created by the discrete cosine transform coefficient prediction apparatus of FIG. 3.

FIG. 6 shows correlation coefficients between the prediction coefficients and the transform coefficients, created by the discrete cosine transform coefficient prediction apparatus of FIG. 3. The correlation coefficients between the prediction coefficients and the transform coefficients are calculated by the above Equation (1). A comparison of FIG. 6 with FIG. 2 shows that the correlation coefficients between the transform coefficients and the prediction coefficients for the transform coefficients, created by the discrete cosine transform coefficient prediction apparatus according to the present invention of FIG. 3, are greater than the correlation coefficients between the transform coefficients and the prediction coefficients for the transform coefficients, created by the conventional transform coefficient prediction method shown in FIG. 2.

Figure 7:
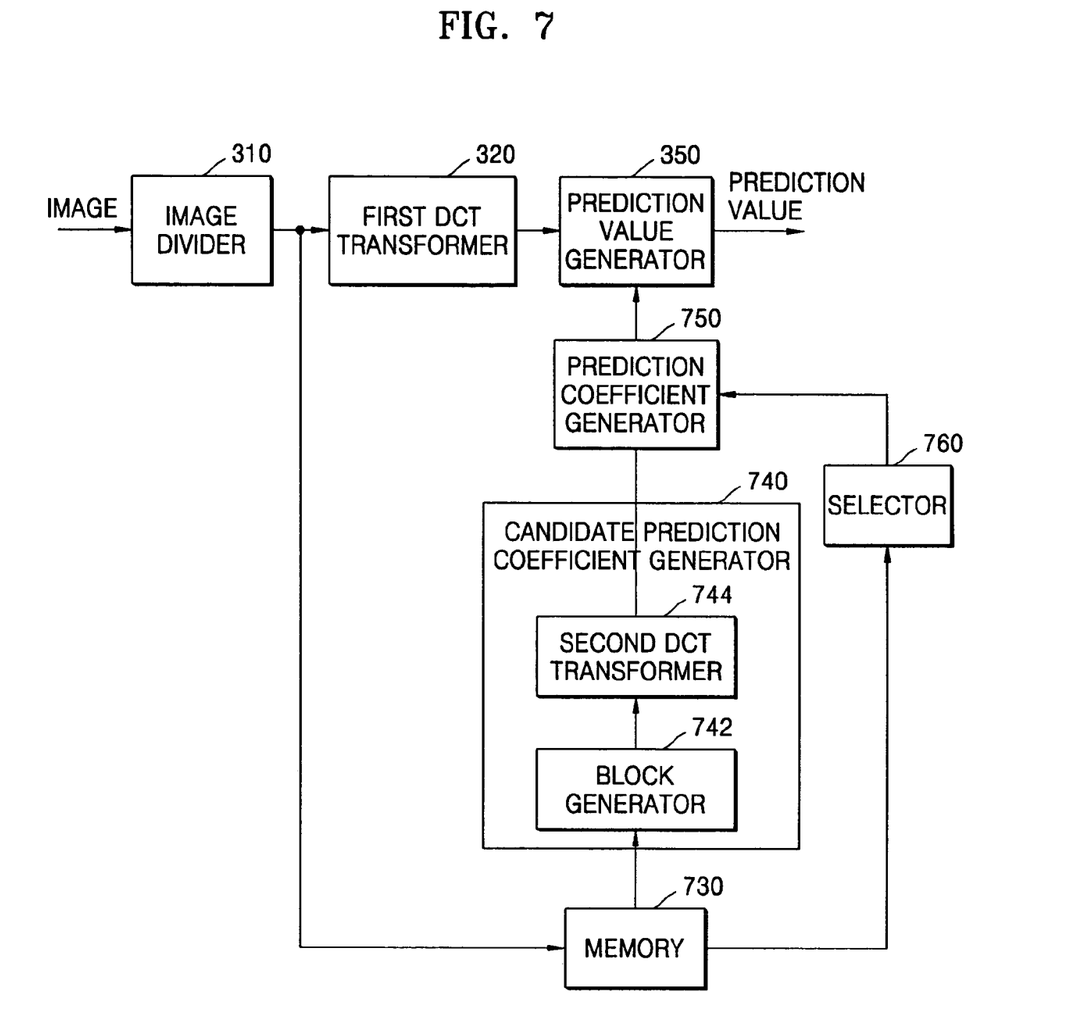
FIG. 7 is a functional block diagram of a discrete cosine transform coefficient prediction apparatus according to another embodiment of the present invention.

FIG. 7 is a functional block diagram of a discrete cosine transform coefficient prediction apparatus according to another embodiment of the present invention. The discrete cosine transform coefficient prediction apparatus includes an image divider 310, a first DCT transformer 320, a memory 730, a candidate prediction coefficient generator 740, a prediction coefficient generator 750, a selector 760 and a prediction value generator 350. As described above with reference to FIG. 3, the image divider 310 divides an image into pixel blocks with predetermined sizes and the first DCT transformer 320 performs a discrete cosine transform on the pixel block to be predicted. The memory 730 stores pixel blocks for the image and a plurality of prediction modes. The candidate prediction coefficient generator 740 includes a block generator 742 and a second DCT transformer 744, and performs a discrete cosine transform on a pixel block made from a predetermined row and column of pixel blocks nearest to a transform coefficient to be predicted in a discrete cosine transform block among pixel blocks adjacent to the discrete cosine transform block to be predicted, creating prediction coefficients for the transform coefficient to be predicted. The block generator 742 creates pixel blocks corresponding to the size of the discrete cosine transform block using the predetermined row and column of the pixel blocks nearest to the transform coefficient to be predicted, and the second DCT transformer 744 performs a discrete cosine transform on each of the created pixel blocks using the RCA method to create candidate prediction coefficients for the transform coefficient to be predicted. The predetermined row and column may be a nearest row and column to the transform block in the pixel blocks nearest to the transform block. The prediction coefficient generator 750 creates prediction coefficients corresponding to a predetermined prediction mode based on the candidate prediction coefficients. The selector 760 selects a predetermined prediction mode for creating the prediction coefficients among a plurality of prediction modes stored in the memory 730. As described above with reference to FIG. 3, the prediction value generator 350 calculates a difference between the prediction coefficients created by the selected prediction mode and the transform coefficient to be predicted and creates a prediction value for the transform coefficient to be predicted based on the difference.

Figure 8A:
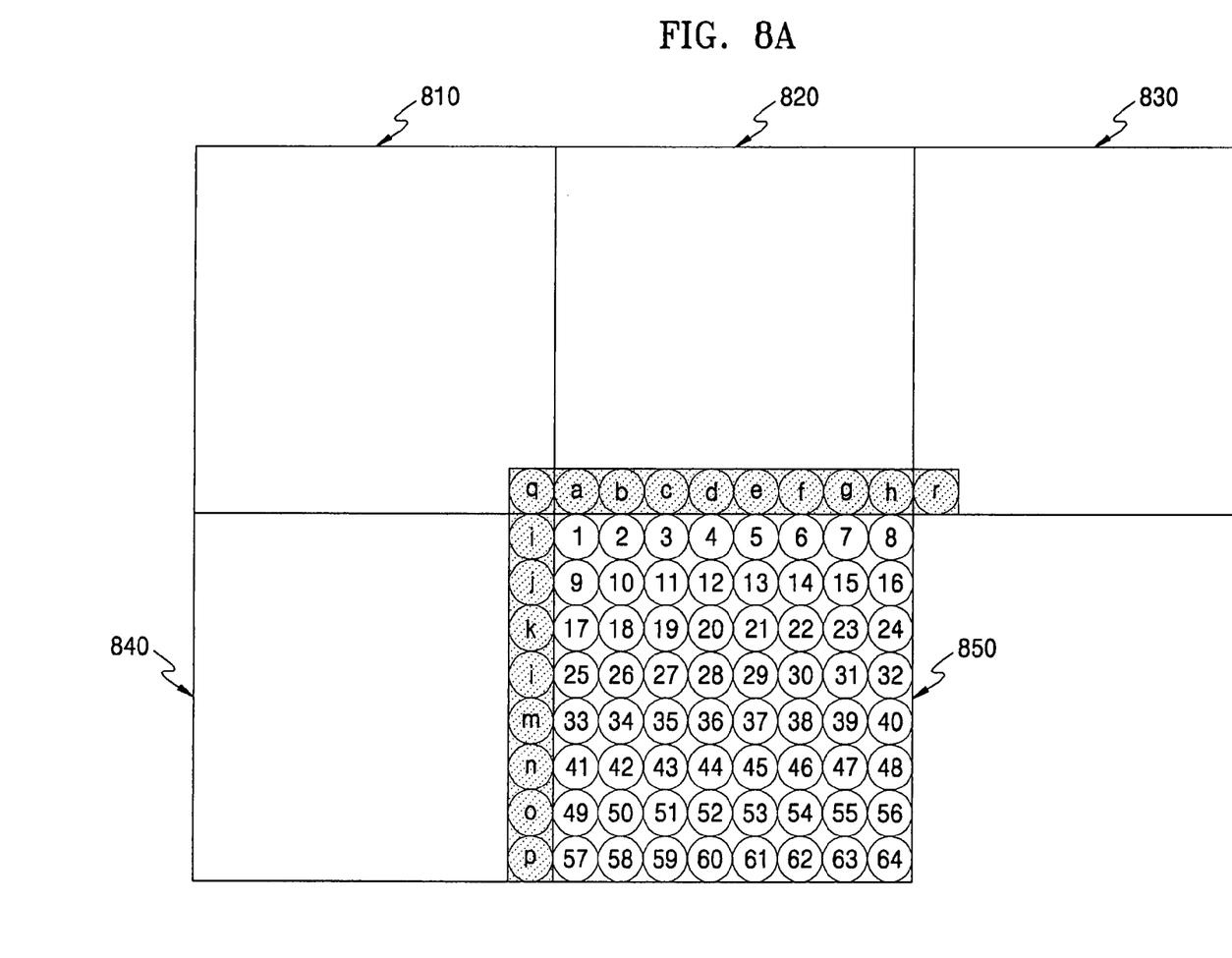
FIG. 8A shows pixel coefficients used for creating candidate prediction coefficients and FIG. 8B shows candidate prediction coefficients created by the pixel coefficients.
Figure 8B:
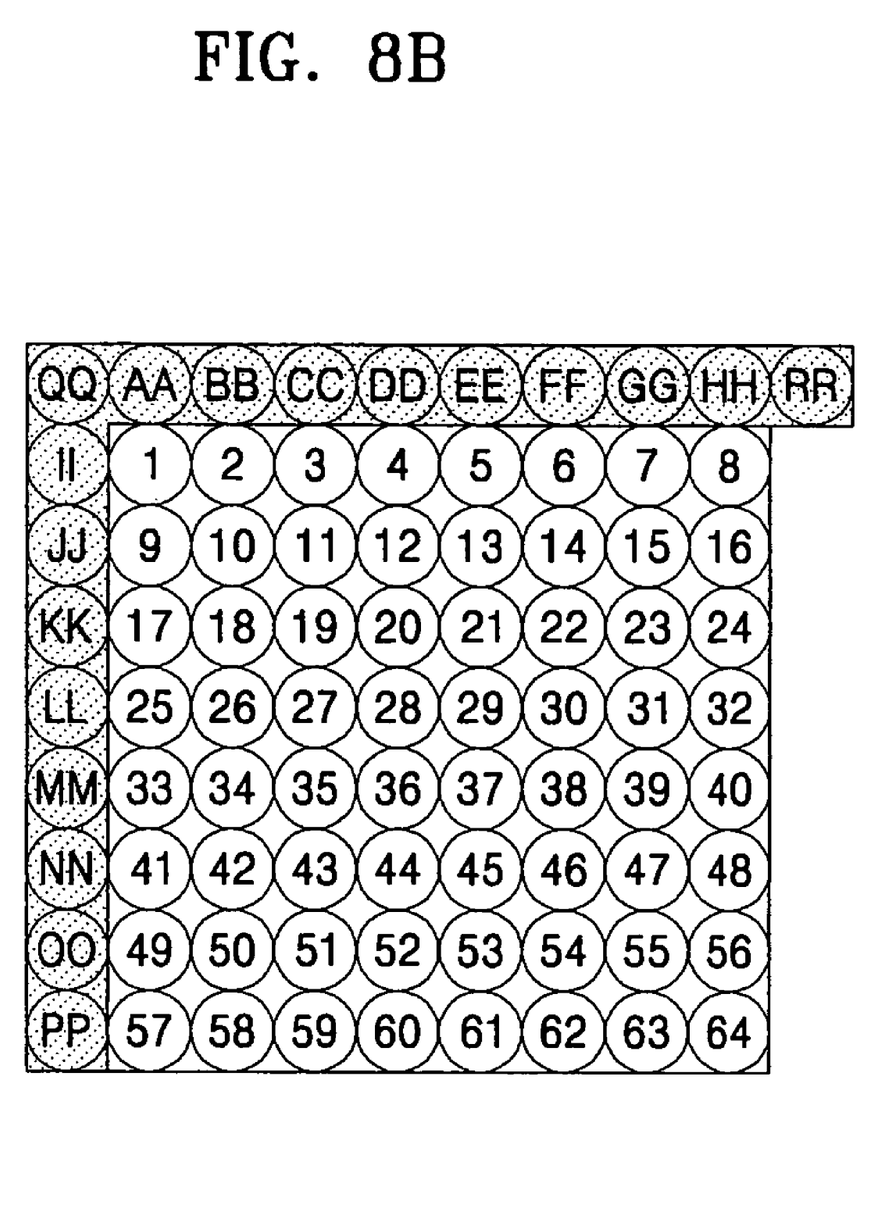

FIG. 8A shows pixel coefficients used for creating candidate prediction coefficients. In FIG. 8A, blocks 810, 820, 830 and 840 are pixel blocks and a block 850 is a discrete cosine transform block wherein the pixel blocks 810 through 840 are adjacent pixel blocks of the discrete cosine transform block 850 in a spatial area. To create prediction coefficients for transform coefficients 1 through 8 of the transform block 850, pixel coefficients a through h of the pixel block 820, a pixel coefficient q of the pixel block 810, and a pixel coefficient r of the pixel block 830 are used. Meanwhile, to create candidate prediction coefficients for transform coefficients 1, 9, 17, 25, 33, 41, 49 and 57 of the transform block 840, pixel coefficients i through p of the pixel block 840 and the pixel coefficient q of the pixel block 810 are used. FIG. 8B shows candidate prediction coefficients created by performing a discrete cosine transform on each of the pixel coefficients of FIG. 8A, using the method described above with reference to FIG. 5. Here, a candidate prediction coefficient QQ is a value stored when a prediction coefficient for a transform block located at the left side of the transform block 850 was created. A candidate prediction coefficient RR is a value created by applying Equation (2) on pixel coefficients of an upper right pixel block of the transform block 850.

Figure 9A:
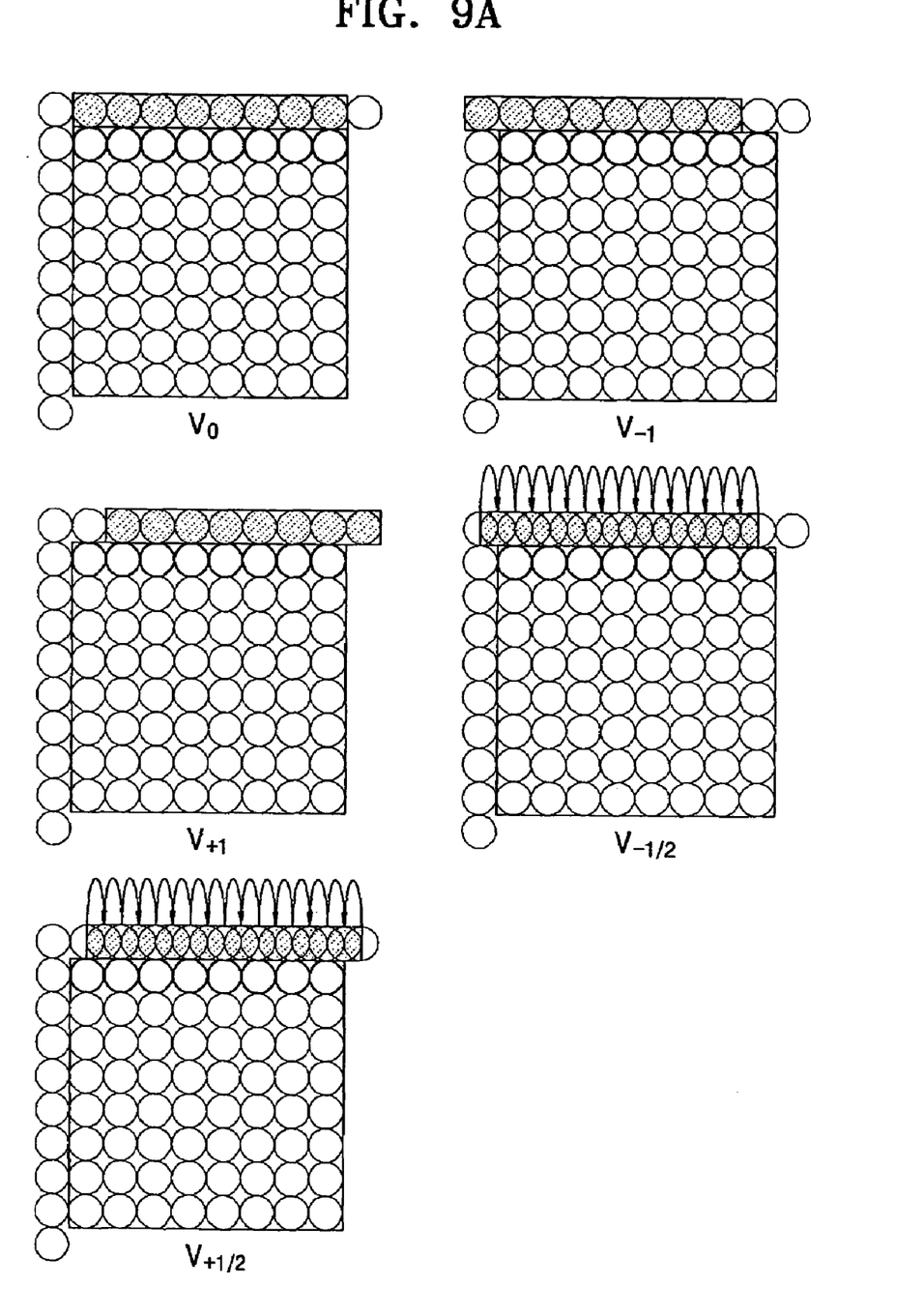
FIGS. 9A and 9B shows prediction modes used in the discrete cosine transform coefficient prediction apparatus of FIG. 7.
Figure 9B:
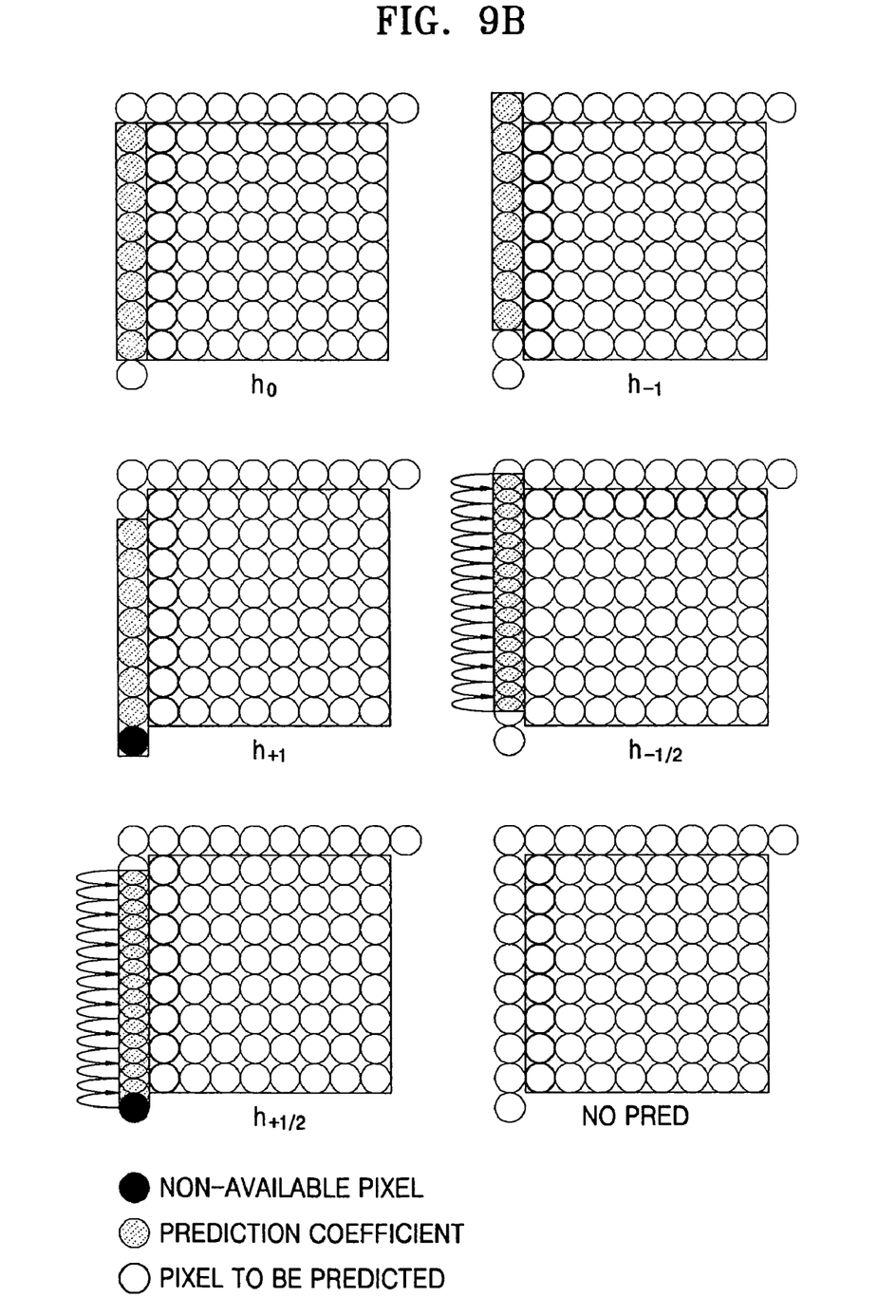

FIGS. 9A and 9B show prediction modes used in the discrete cosine transform coefficient prediction apparatus of FIG. 7. FIGS. 9A and 9B show prediction modes capable of being used for an 8×8 block. Here, a $V_0$ mode is a mode using a row of the upper candidate prediction coefficients of transform coefficients to be predicted; a $V_{-1}$ mode is a mode using a row of candidate prediction coefficients moved by one coefficient in the row of the upper candidate prediction coefficients of the transform coefficients to be predicted into the left direction; a $V_{+1}$ mode is a mode using a row of candidate prediction coefficients moved by one coefficient in the row of the upper candidate prediction coefficients of the transform coefficients to be predicted into the right direction; a $V_{-1/2}$ mode is a mode using a row of candidate prediction coefficients moved by a ½ coefficient in the row of the upper candidate prediction coefficients of the transform coefficients to be predicted into the left direction; a $V_{+1/2}$ mode is a mode using a row of candidate prediction coefficients moved by a ½ coefficient in the row of the upper candidate prediction coefficients of the transform coefficients to be predicted into the right direction; an $h_0$ mode is a mode using a column of left candidate prediction coefficients neighboring to a column of the transform coefficients to be predicted; an $h_{-1}$ mode is a mode using a column of candidate prediction coefficients moved by one coefficient in the column of the left candidate prediction coefficients of the transform coefficients to be predicted into the up direction; an $h_{+1}$ mode is a mode using a column of candidate prediction coefficients moved by one coefficient in the column of the left candidate prediction coefficients of the transform coefficients to be predicted into the down direction; an $h_{-1/2}$ mode is a mode using a column of candidate prediction coefficients moved by a ½ coefficient in the column of the left candidate prediction coefficients of the transform coefficients to be predicted into the up direction; an $h_{+1/2}$ mode is a mode using a column of candidate prediction coefficients moved by a ½ coefficient in the column of the left candidate prediction coefficients of the transform coefficients to be predicted into the down direction; and a NO PRED mode is a mode using the transform coefficients to be predicted as prediction values, that is, a mode of coding the transform coefficients to be predicted without prediction. Prediction coefficients not capable of be used in the $h_{+1}$ and $h_{+1/2}$ modes are substituted by the upper prediction coefficient values thereof. In the $V_{-1/2}$, $V_{+1/2}$, $h_{+1}$ and $h_{+1/2}$ modes, the one prediction coefficient is newly made by averaging the value of 2 prediction coefficients and the prediction coefficients is moved by a ½ coefficient. Prediction coefficients for the transform coefficients to be predicted are created using one among the plurality of prediction modes.

Preferably, one among the plurality of prediction modes is selected by the selector 760. For example, a prediction mode with a highest correlation among the plurality of prediction modes is selected, to create prediction coefficients for the transform coefficients to be predicted. FIGS. 9A and 9B show prediction modes for creating prediction coefficients for transform coefficients to be predicted by moving candidate prediction coefficients by a 1 or ½ coefficient, however, it is also possible to create prediction coefficients for transform coefficients to be predicted by moving candidate prediction coefficients by a predetermined number.

Figure 10:
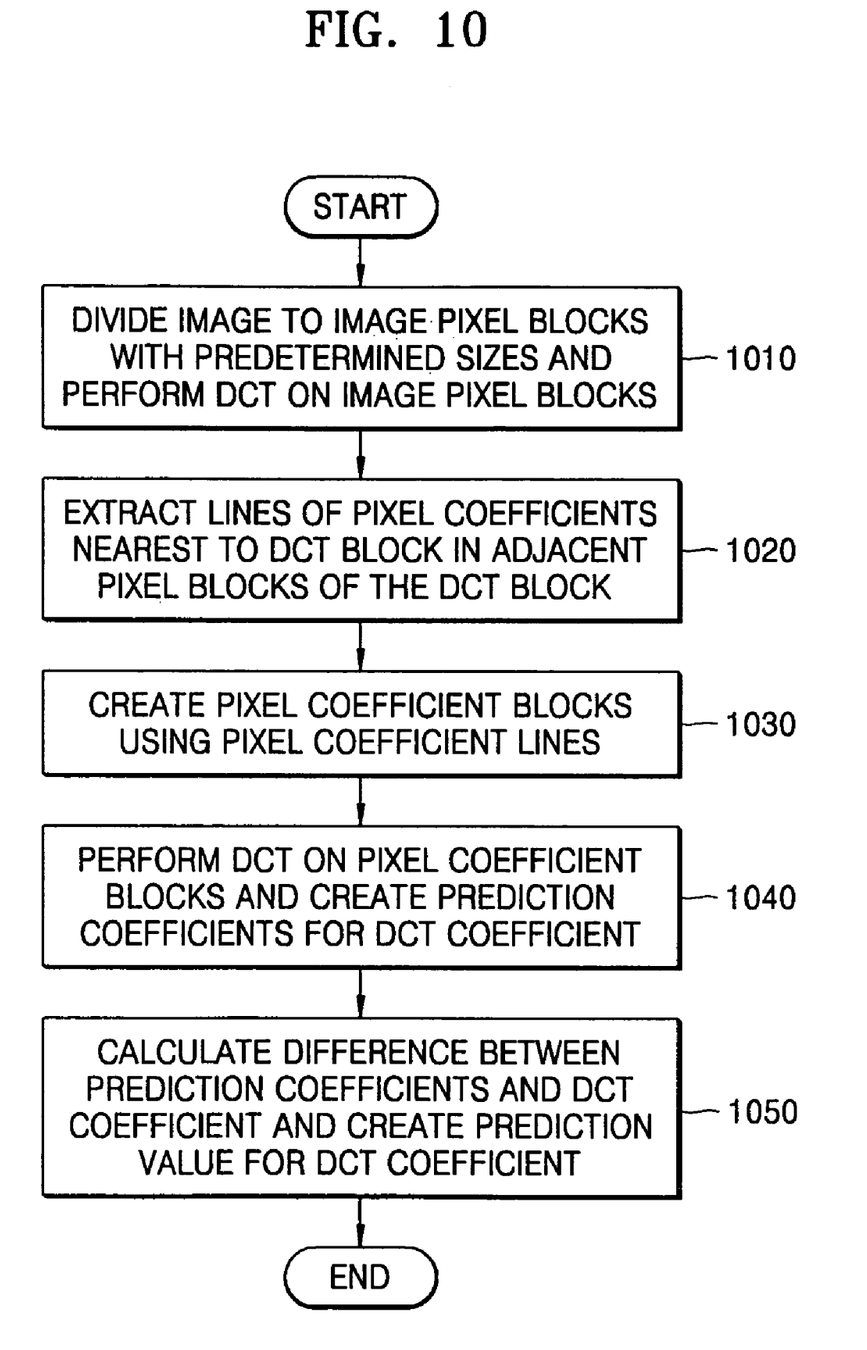
FIG. 10 is a flowchart illustrating a discrete cosine transform coefficient prediction method performed by the discrete cosine transform coefficient prediction apparatus of FIG. 3, according to an embodiment of the present invention.

FIG. 10 is a flowchart illustrating a transform coefficient prediction method performed by the transform coefficient prediction apparatus of FIG. 3, according to an embodiment of the present invention. In the embodiment shown in FIG. 10, the transform coefficient prediction method includes creating prediction coefficients for a transform coefficient to be predicted at operations 1010 through 1040, and creating a prediction value for the transform coefficient to be predicted at operation 1050. Referring to FIG. 10, first, an input image is divided into pixel blocks with predetermined sizes and a discrete cosine transform is performed on each of the pixel blocks to create a discrete cosine transform block at operation 1010. Then, a row and column of pixel blocks nearest to a transform coefficient to be predicted in the discrete cosine transform block to be predicted among pixel blocks adjacent to the discrete cosine transform block to be predicted, are extracted at operation 1020. The extracted row and column of the pixel blocks are copied in horizontal and vertical directions, respectively, to create pixel blocks corresponding to the size of the discrete cosine transform block at operation 1030. By performing a discrete cosine transform on the pixel block created by copying the row of the pixel block in the vertical direction using Equation (2) and performing a discrete cosine transform on the discrete cosine transformed value in a horizontal direction, a prediction coefficient for the transform coefficient to be predicted is created. Meanwhile, by performing a discrete cosine transform on the pixel block created by copying the column of the pixel block in a horizontal direction in a horizontal direction using Equation (2) and performing a discrete cosine transform on the discrete cosine transformed value in a vertical direction, a prediction coefficient for the transform coefficient to be predicted is created at operation 1040. Then, a difference between the transform coefficient to be predicted and the prediction coefficients is calculated and a prediction value for the transform coefficient to be predicted is created based on the difference at operation 1050.

Figure 11:
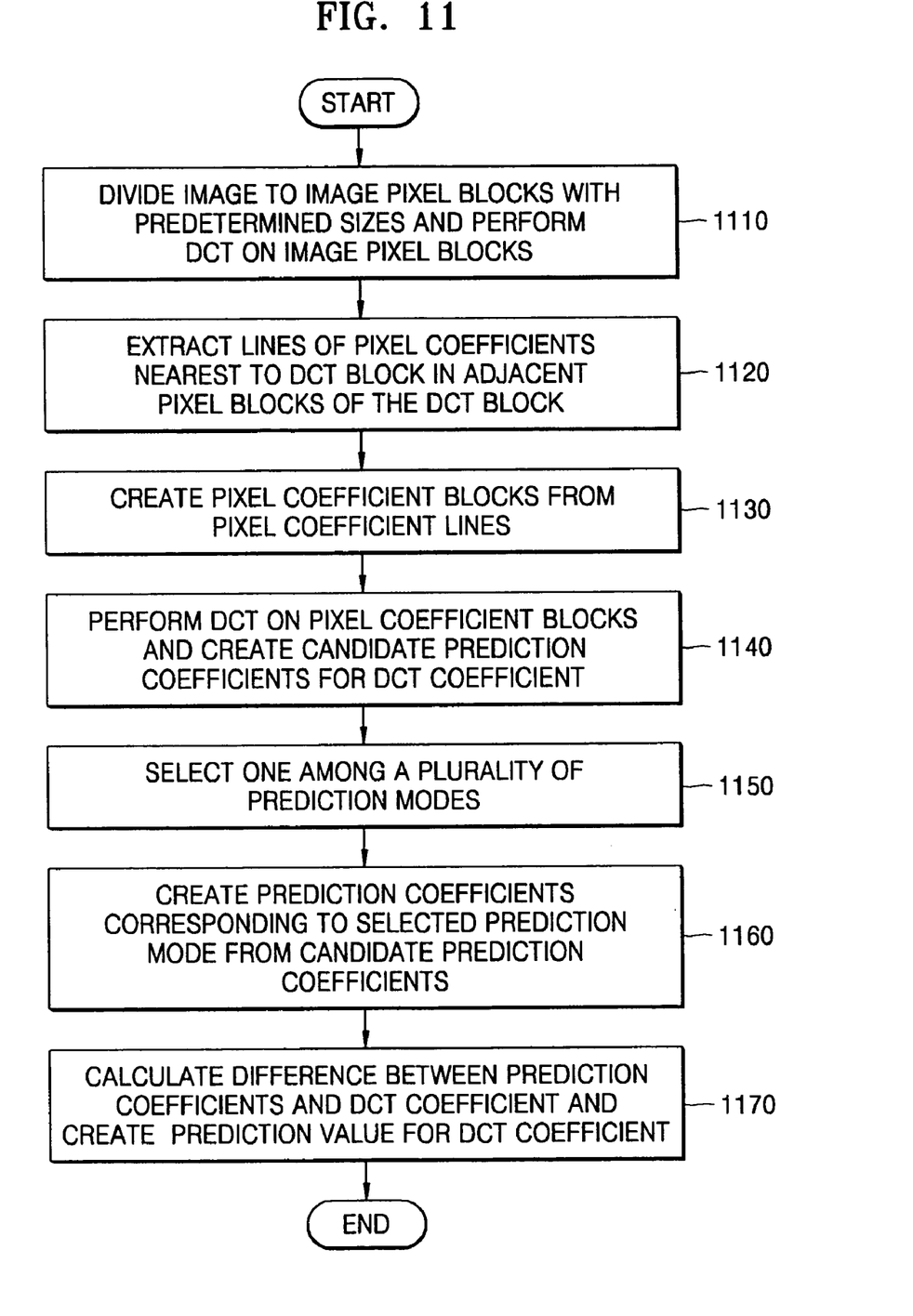
FIG. 11 is a flowchart illustrating a discrete cosine transform coefficient prediction method performed by the discrete cosine transform coefficient prediction apparatus of FIG. 7, according to another embodiment of the present invention.

FIG. 11 is a flowchart illustrating a transform coefficient prediction method performed by the transform coefficient prediction apparatus of FIG. 7, according to another embodiment of the present invention, wherein the transform coefficient prediction method includes creating candidate prediction coefficients at operations 1100 through 1140, creating prediction coefficients according to a predetermined prediction mode at operations 1150 and 1160, and creating a prediction value for a transform coefficient at operation 1170. In the transform coefficient prediction method of FIG. 11, operations 1100 through 1140 are the same as the operations 1010 through 1040 of FIG. 10 with the following exception. In operation 1040 of FIG. 10, prediction coefficients for a transform coefficient to be predicted are created, while in operation 1140 of FIG. 11, candidate prediction coefficients for a transform coefficient to be predicted are created and then a prediction coefficient is created based on the candidate prediction coefficients in a predetermined prediction mode. As the predetermined prediction mode, one among a plurality of prediction modes is selected by a user, for example, a prediction mode with highest correlation to the transform coefficient to be predicted can be selected at operation 1150. Then, a prediction value for the transform coefficient to be predicted is created using a difference between prediction coefficients created in a predetermined prediction mode and the transform coefficient to be predicted at operation 1170.

The embodiments of the present invention as described above may be embodied as computer readable code on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices.

As described above, according to the transform coefficient prediction method and apparatus of the present invention, by creating prediction coefficients with high correlation to a discrete cosine transform coefficient to be predicted and generating a prediction value for the transform coefficient to be predicted using the created prediction coefficients, it is possible to efficiently compress an image. Also, by creating a prediction coefficient using candidate prediction coefficients in a predetermined prediction mode, compression efficiency may be enhanced.

Although a few embodiments of the present invention have been shown and described, it would be appreciated by those skilled in the art that changes may be made in these embodiments without departing from the principles and spirit of the invention, the scope of which is defined in the claims and their equivalents

What is claimed is:

1. A discrete cosine transform coefficient prediction method comprising:
   copying, using a computing apparatus, pixel coefficients in a row and a column spatially nearest to a transform coefficient to be predicted in a discrete cosine transform block to be predicted, respectively within pixel blocks adjacent to the discrete cosine transform block to be predicted, to create pixel blocks corresponding to the size of the discrete cosine transform block;
   performing separately one-dimensional discrete cosine transform on the respective rows and columns of each of the created pixel blocks;
   creating prediction coefficients for the transform coefficient to be predicted; and
   creating a prediction value for the transform coefficient to be predicted using a difference between the created prediction coefficients and the transform coefficient to be predicted.

2. The method of claim 1, further comprising:
   dividing an image to be compressed into pixel blocks with predetermined sizes and performing a discrete cosine transform on the pixel block to be predicted of the divided pixels, prior to the performing of the discrete cosine transform and the creating of the prediction coefficients.

3. The method of claim 1, wherein the transform coefficient to be predicted is a coefficient at a first row and a first column of the discrete cosine transform block to be predicted.

4. The method of claim 1, wherein the one-dimensional discrete cosine transform is performed on each of the created pixel blocks using a Row Column Algorithm (RCA) method.

5. A discrete cosine transform coefficient prediction method comprising:
   creating, using a computing apparatus, candidate prediction coefficients for a transform coefficient to be predicted, using coefficients created by copying pixel coefficients in a row and a column spatially nearest to a transform coefficient to be predicted in a discrete cosine transform block to be predicted, respectively within pixel blocks adjacent to the discrete cosine transform block to be predicted, to create pixel blocks corresponding to the size of the discrete cosine transform block;
   performing separately one-dimensional discrete cosine transform on the respective rows and columns of each of the created pixel blocks, a predetermined number of coefficients at the most right side of prediction coefficients for a transform block located at the left side of the discrete cosine transform block to be predicted, and a predetermined number of coefficients at the most left side of coefficients created by performing a discrete cosine transform on pixel coefficients of a pixel block located at an upper right side of the discrete cosine transform block to be predicted;
   selecting a prediction mode for creating prediction coefficients for the transform coefficient to be predicted from among a plurality of prediction modes;
   creating prediction coefficients for the transform coefficient to be predicted according to the selected prediction mode based on the candidate prediction coefficients; and
   generating a prediction value for the transform coefficient to be predicted using a difference between the created prediction coefficients and the transform coefficient to be predicted.

6. The method of claim 5, further comprising:
   dividing an image to be compressed into pixel blocks with predetermined sizes and performing a discrete cosine transform on a pixel block to be predicted of the divided pixel block, prior to the creating of the candidate prediction coefficients.

7. The method of claim 5, wherein the prediction mode comprises at least one among:
   a $V_0$ mode using a row of the upper candidate prediction coefficients of transform coefficients to be predicted;
   a $V_{-1}$ mode using a row of candidate prediction coefficients moved by one coefficient in the row of the upper candidate prediction coefficients of the transform coefficients to be predicted into the left direction;
   a $V_{+1}$ mode using a row of candidate prediction coefficients moved by one coefficient in the row of the upper candidate prediction coefficients of the transform coefficients to be predicted into the right direction;
   a $V_{-1/2}$ mode using a row of candidate prediction coefficients moved by a ½ coefficient in the row of the upper candidate prediction coefficients of the transform coefficients to be predicted into the left direction;
   a $V_{+1/2}$ mode using a row of candidate prediction coefficients moved by a ½ coefficient in the row of the upper candidate prediction coefficients of the transform coefficients to be predicted into the right direction;
   an $h_0$ mode using a column of left candidate prediction coefficients neighboring to a column of the transform coefficients to be predicted;

an $h_{-1}$ mode using a column of candidate prediction coefficients moved by one coefficient in the column of the left candidate prediction coefficients of the transform coefficients to be predicted into the up direction;

an $h_{+1}$ mode using a column of candidate prediction coefficients moved by one coefficient in the column of the left candidate prediction coefficients of the transform coefficients to be predicted into the down direction;

an $h_{-1/2}$ mode using a column of candidate prediction coefficients moved by a ½ coefficient in the column of the left candidate prediction coefficients of the transform coefficients to be predicted into the up direction;

an $h_{+1/2}$ mode using a column of candidate prediction coefficients moved by a ½ coefficient in the column of the left candidate prediction coefficients of the transform coefficients to be predicted into the down direction; or a No Pred mode using the transform coefficients to be predicted as prediction values.

8. The method of claim 5, wherein in the performing separately of the discrete transform on each of the created pixel blocks and the generating of the transform coefficients, the one-dimensional discrete cosine transform is performed on each of the pixel blocks using a Row Column Algorithm (RCA) method.

9. The method of claim 5, wherein the transform coefficient to be predicted is a coefficient at a first row and a first column of the discrete cosine transform block to be predicted.

10. A computer-readable medium having embodied thereon a computer program for executing a discrete cosine transform coefficient prediction method, the computer-readable medium comprising instructions for:
copying pixel coefficients in a row and a column spatially nearest to a transform coefficient to be predicted in a discrete cosine transform block to be predicted, respectively within pixel blocks adjacent to the discrete cosine transform block to be predicted, to create pixel blocks corresponding to the size of the discrete cosine transform block;
performing separately one-dimensional discrete cosine transform on the respective rows and columns of each of the created pixel blocks;
creating prediction coefficients for the transform coefficient to be predicted; and
creating a prediction value for the transform coefficient to be predicted using a difference between the created prediction coefficients and the transform coefficient to be predicted.

11. A DCT coefficient prediction apparatus comprising:
a prediction coefficient generator copying pixel coefficients in a row and a column spatially nearest to a transform coefficient to be predicted in a discrete cosine transform block to be predicted, respectively within pixel blocks adjacent to the discrete cosine transform block to be predicted, to create pixel blocks corresponding to the size of the discrete cosine transform block, performing separately one-dimensional discrete cosine transform on the respective rows and column of each of the created pixel blocks and creating prediction coefficients for the transform coefficient to be predicted;
a prediction value generator creating a prediction value for the transform coefficient to be predicted using a difference between the created prediction coefficients and the transform coefficient to be predicted; and
a memory storing the pixel blocks.

12. The apparatus of claim 11, further comprising:
an image divider dividing an image to be compressed into pixel blocks with predetermined sizes;
a first DCT transformer performing a discrete cosine transform of the divided pixel blocks on the pixel block to be predicted; and
a memory storing the divided pixel blocks.

13. The apparatus of claim 12 wherein the prediction coefficient generator comprises:
a block generator copying a row and column of pixel blocks, nearest to the transform coefficient to be predicted, respectively, and generating pixel blocks corresponding to the size of the discrete cosine transform block, respectively; and
a second DCT transformer performing a discrete cosine transform on each of the created pixel blocks and generating prediction coefficients for the transform coefficient to be predicted.

14. The apparatus of claim 11, wherein the transform coefficient to be predicted is a coefficient at a first row and a first column of the discrete cosine transform block to be predicted.

15. The apparatus of claim 13 wherein the second DCT transformer performs the one-dimensional discrete cosine transform on each of the pixel blocks created by the block generator using a Row Column Algorithm (RCA) method.

16. A DCT coefficient prediction apparatus comprising:
a candidate prediction coefficient generator creating candidate prediction coefficients for a transform coefficient to be predicted, using coefficients created by copying pixel coefficients in a row and a column spatially nearest to a transform coefficient to be predicted in a discrete cosine transform block to be predicted, respectively within pixel blocks adjacent to the discrete cosine transform block to be predicted, to create pixel blocks corresponding to the size of the discrete cosine transform block;
performing separately one-dimensional discrete cosine transform on the respective rows and columns of each of the created pixel blocks, a predetermined number of transform coefficients at the most right side of prediction coefficients in a transform block located at the left side of the discrete cosine transform block to be predicted, and a predetermined number of transform coefficients at the most left side of coefficients created by performing a discrete cosine transform on pixel coefficients of a pixel block located at the upper right side of the discrete cosine transform block to be predicted;
a selector selecting a prediction mode for creating prediction coefficients for the transform coefficient to be predicted among a plurality of prediction modes;
a prediction coefficient generator creating the prediction coefficients for the transform coefficient to be predicted according to the selected prediction mode;
a prediction value generator generating a prediction value for the transform coefficient to be predicted using a difference between the created prediction coefficients and the transform coefficient; and
a memory storing the pixel blocks.

17. The apparatus of claim 16, further comprising:
an image divider dividing an image to be compressed into pixel blocks with predetermined sizes;
a first DCT transformer performing a discrete cosine transform on the pixel block to be predicted of the divided pixel blocks; and
a memory storing the divided pixel blocks and the prediction mode.

18. The apparatus of claim 16, wherein the selected prediction mode comprises at least one among:
a $V_0$ mode using a row of the upper candidate prediction coefficients of transform coefficients to be predicted;

a $V_{-1}$ mode using a row of candidate prediction coefficients moved by one coefficient in the row of the upper candidate prediction coefficients of the transform coefficients to be predicted into the left direction;

a $V_{+1}$ mode using a row of candidate prediction coefficients moved by one coefficient in the row of the upper candidate prediction coefficients of the transform coefficients to be predicted into the right direction;

a $V_{-1/2}$ mode using a row of candidate prediction coefficients moved by a ½ coefficient in the row of the upper candidate prediction coefficients of the transform coefficients to be predicted into the left direction;

a $V_{+1/2}$ mode using a row of candidate prediction coefficients moved by a ½ coefficient in the row of the upper candidate prediction coefficients of the transform coefficients to be predicted into the right direction;

an $h_0$ mode using a column of left candidate prediction coefficients neighboring to a column of the transform coefficients to be predicted;

an $h_{-1}$ mode using a column of candidate prediction coefficients moved by one coefficient in the column of the left candidate prediction coefficients of the transform coefficients to be predicted into the up direction;

an $h_{+1}$ mode using a column of candidate prediction coefficients moved by one coefficient in the column of the left candidate prediction coefficients of the transform coefficients to be predicted into the down direction;

an $h_{-1/2}$ mode using a column of candidate prediction coefficients moved by a ½ coefficient by the column of the left candidate prediction coefficients of the transform coefficients to be predicted into the up direction;

an $h_{+1/2}$ mode using a column of candidate prediction coefficients moved by a ½ coefficient in the column of the left candidate prediction coefficients of the transform coefficients to be predicted into the down direction; or a No Pred mode using the transform coefficients to be predicted as prediction values.

19. The apparatus of claim 16, wherein the candidate prediction coefficient generator comprises:

a block generator copying a predetermined row and column of pixel blocks nearest to the transform coefficient to be predicted, respectively, and generating pixel blocks corresponding to the size of the discrete cosine transform block, respectively; and a second DCT transformer performing a discrete cosine transform on each of the created pixel blocks.

20. The apparatus of claim 16, wherein the second DCT transformer performs the one-dimensional discrete cosine transform on each of the pixel blocks created by the block generator using a Row Column Algorithm (RCA) method.

21. The apparatus of claim 16, wherein the transform coefficient to be predicted is a coefficient at a first row and a first column of the discrete cosine transform block to be predicted.

22. A computer-readable medium having embodied thereon a computer program for executing a discrete cosine transform coefficient prediction, the computer readable medium comprising instructions for:

creating candidate prediction coefficients for a transform coefficient to be predicted, using coefficients created by copying pixel coefficients in a row and a column spatially nearest to a transform coefficient to be predicted in a discrete cosine transform block to be predicted, respectively within pixel blocks adjacent to the discrete cosine transform block to be predicted, to create pixel blocks corresponding to the size of the discrete cosine transform block, respectively; and performing separately one-dimensional discrete cosine transform on the respective rows and columns of each of the created pixel blocks, a predetermined number of coefficients at the most right side of prediction coefficients for a transform block located at the left side of the discrete cosine transform block to be predicted, and a predetermined number of coefficients at the most left side of coefficients created by performing a discrete cosine transform on pixel coefficients of a pixel block located at an upper right side of the discrete cosine transform block to be predicted;

selecting a prediction mode for creating prediction coefficients for the transform coefficient to be predicted from among a plurality of prediction modes;

creating prediction coefficients for the transform coefficient to be predicted according to the selected prediction mode based on the candidate prediction coefficients; and generating a prediction value for the transform coefficient to be predicted using a difference between the created prediction coefficients and the transform coefficient to be predicted.

\* \* \* \* \*